United States Patent [19]

Brolin et al.

[11] Patent Number: 4,717,801

[45] Date of Patent: Jan. 5, 1988

[54] DUAL INDUCTION HEATING PRESSURE WELDING APPARATUS HAVING A CONTROL CIRCUIT

[75] Inventors: Charles A. Brolin, Cedar Rapids; Ronald L. Pike, West Liberty; Dennis A. Jennerjohn, Cedar Rapids, all of Iowa

[73] Assignee: FMC Corporation, Chicago, Ill.

[21] Appl. No.: 896,904

[22] Filed: Aug. 11, 1986

[51] Int. Cl.$^4$ ............................................. B23K 13/00
[52] U.S. Cl. ..................................... 219/9.5; 219/8.5; 219/10.73; 219/10.77
[58] Field of Search ............... 219/9.5, 7.5, 8.5, 10.73, 219/10.75, 10.77, 10.79

[56] References Cited

U.S. PATENT DOCUMENTS

| | | | |
|---|---|---|---|
| 2,892,914 | 7/1958 | Rudd | 219/9.5 |
| 3,007,022 | 10/1959 | Jackson et al. | 219/9.5 |
| 4,012,616 | 3/1977 | Zelahy | 219/9.5 |
| 4,327,265 | 4/1982 | Edinger et al. | 219/9.5 |

Primary Examiner—J. R. Scott
Assistant Examiner—Leon K. Fuller
Attorney, Agent, or Firm—Raymond E. Parks; Lloyd B. Guernsey; Richard B. Megley

[57] ABSTRACT

A welding control circuit for induction heating of a pair of articles to a welding temperature and for pressing the heated articles together. A pair of induction coils are positioned in a gap between the portions of the articles to be heated and a pair of temperature sensors monitor the temperature of both articles and controls heating rates so both articles reach a welding temperature at approximately the same time. The temperature sensors provide signals which cause the coils to be retracted from the gap and cause the heated articles to be pressed together to form a welded pair. When similar articles are to be welded together a single coil can be used to provide induction currents which heat the articles.

17 Claims, 4 Drawing Figures

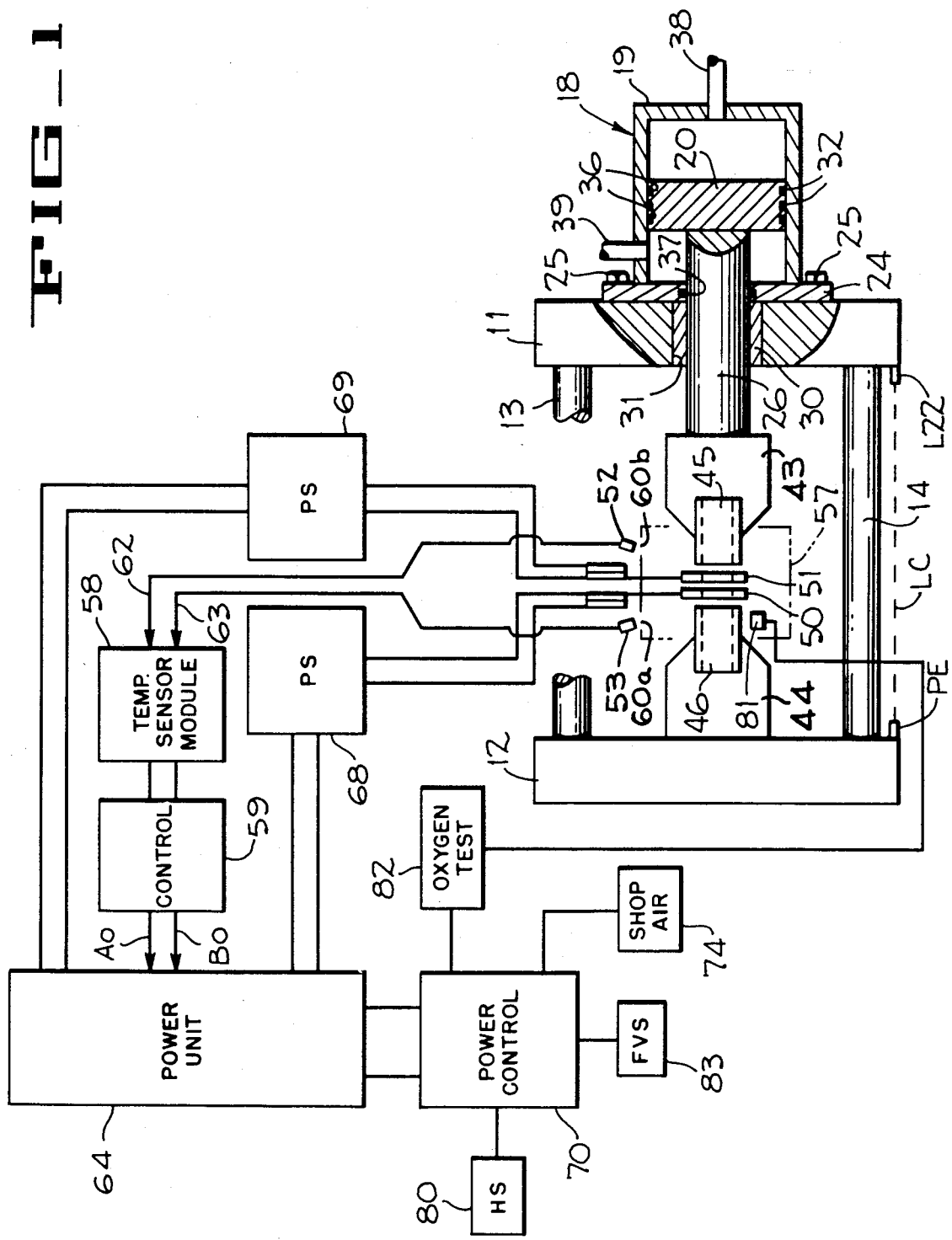
FIG_1

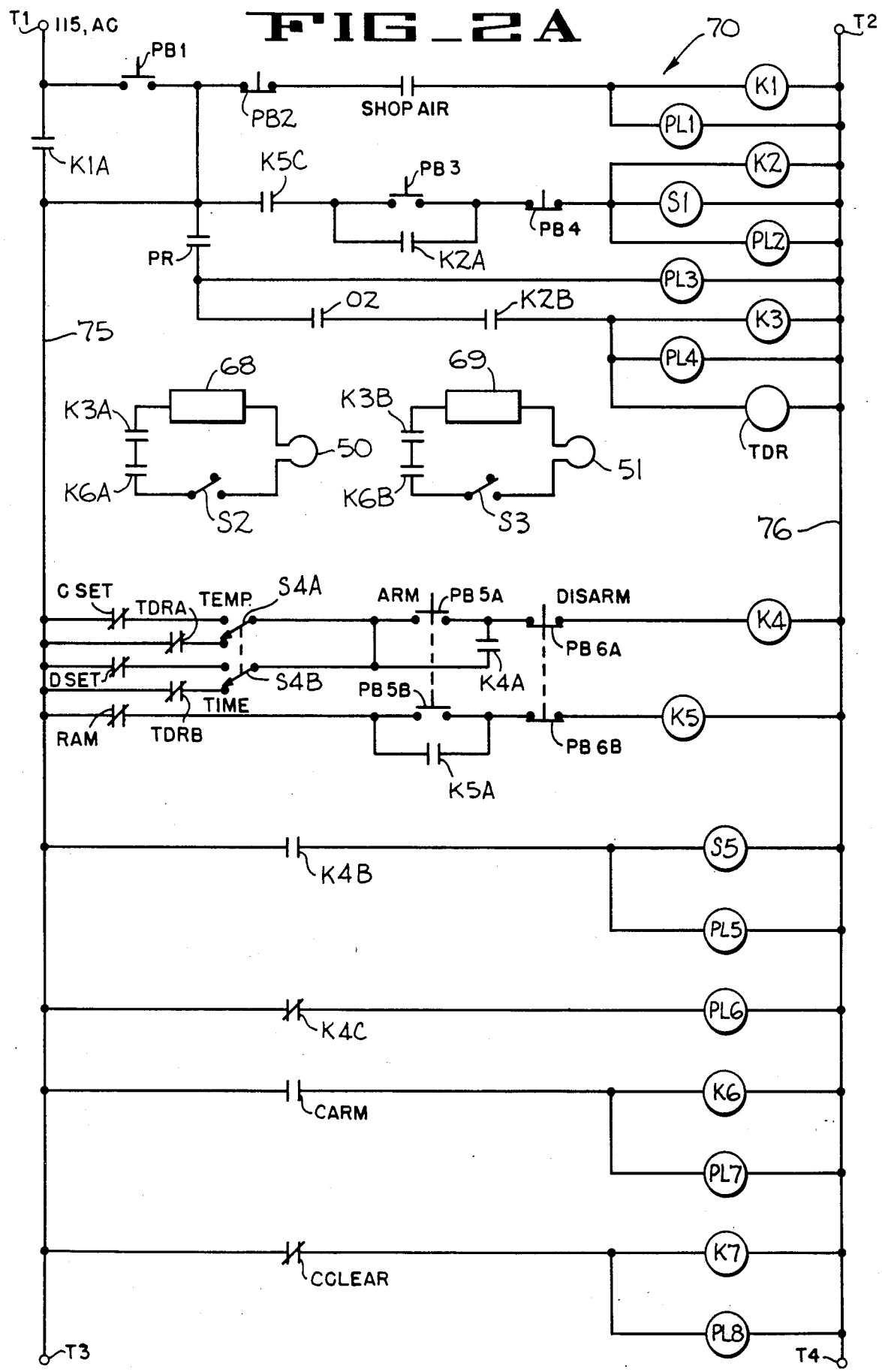

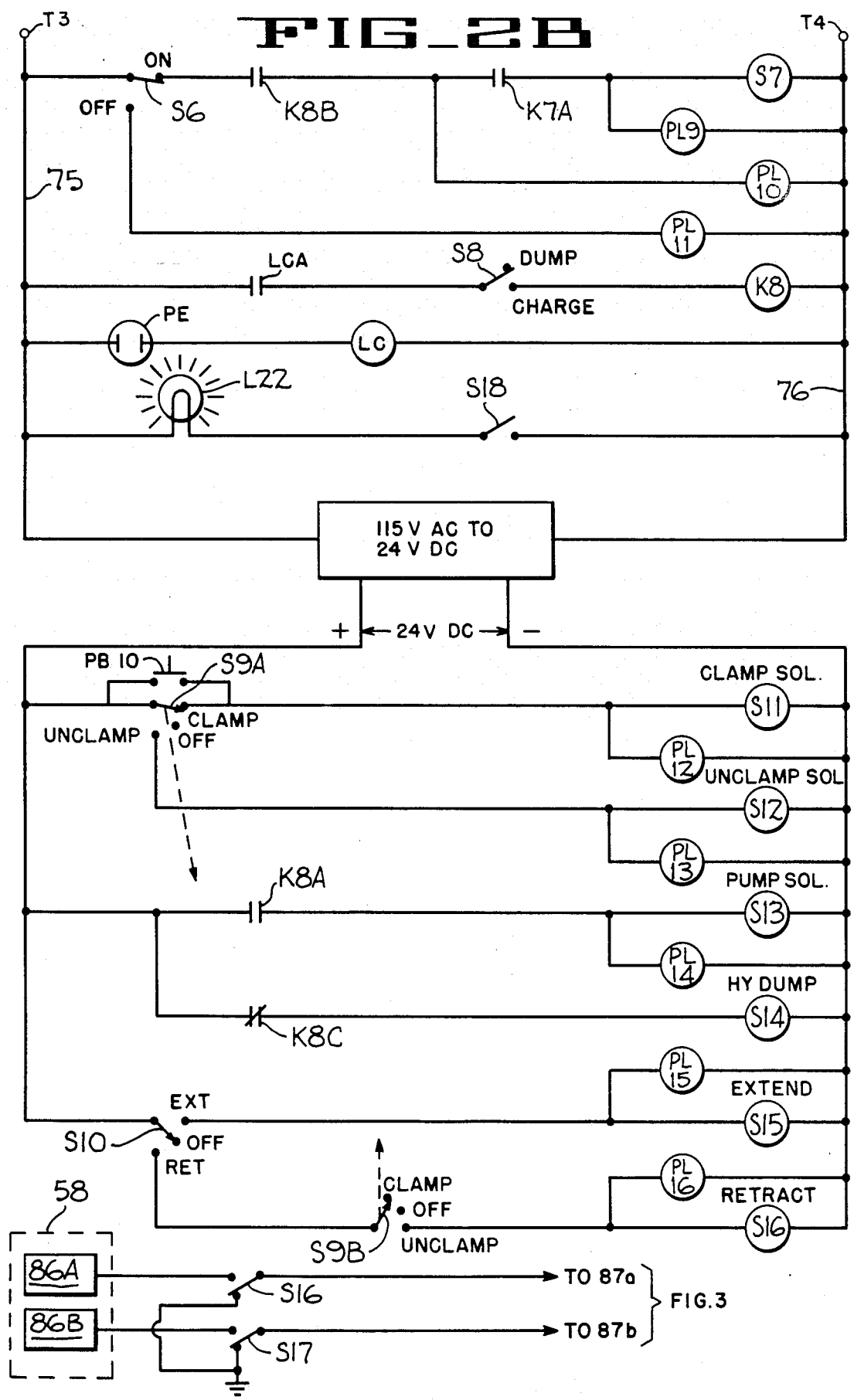

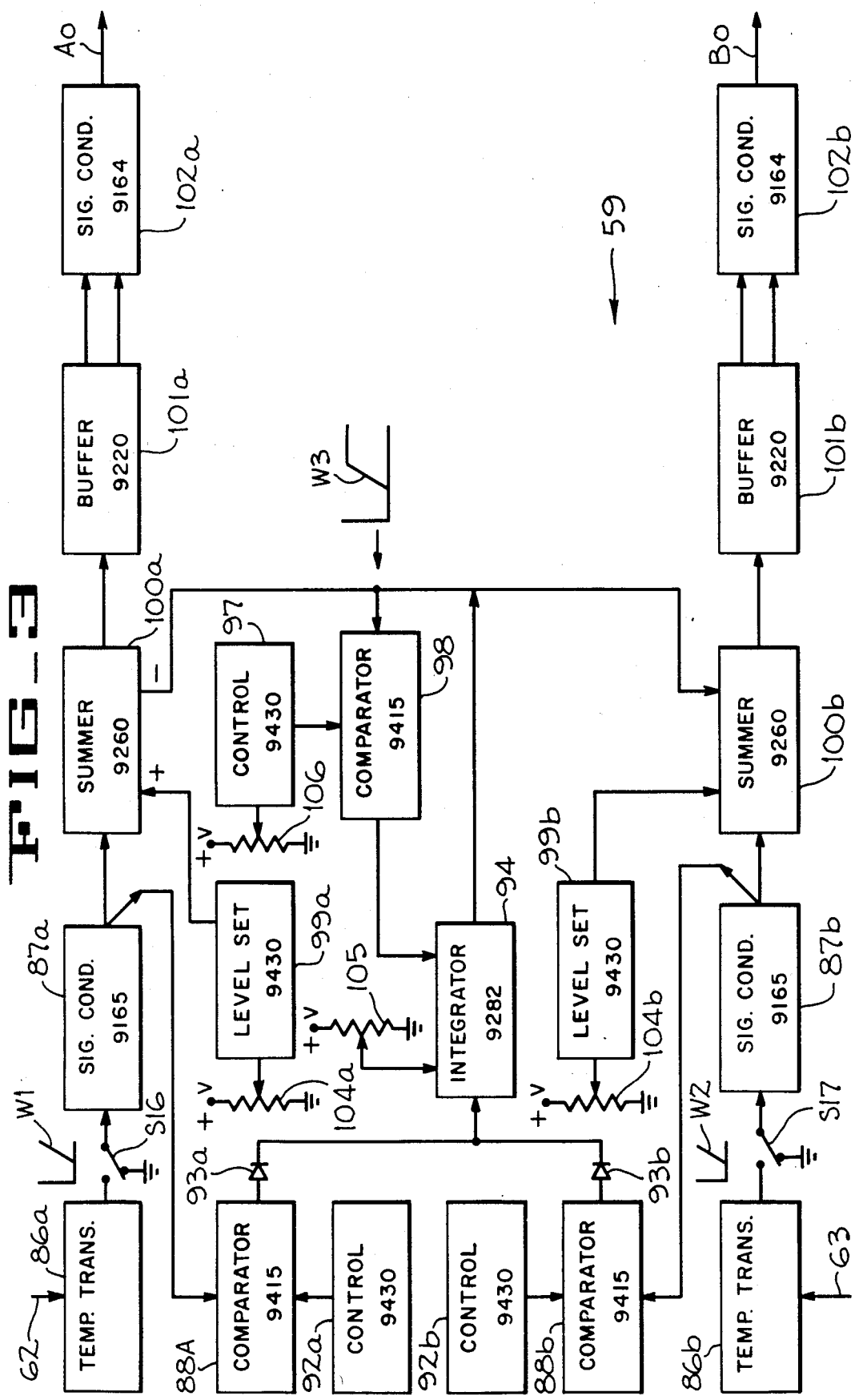

DUAL INDUCTION HEATING PRESSURE WELDING APPARATUS HAVING A CONTROL CIRCUIT

CROSS REFERENCE TO RELATED APPLICATIONS

The present invention relates to the inventions described in the following applications, all of which were assigned to the assignee of the present invention, are filed on even date herewith and are incorporated by reference herein.

Brolin application Ser. No. 06/844,656 filed on Mar. 27, 1986 and entitled Induction Heating Pressure Welding.

Brolin et al application Ser. No. 06/895,399 filed on Aug. 11, 1986 and entitled Induction Heating Pressure Welding With Pivotal Bus Bar Joint.

Brolin application Ser. No. 06/902,852 filed on Sept. 2, 1986 and entitled Induction Heating Pressure Welding With Linear Bus Bar Joint.

Brolin et al application Ser. No. 06/895,085 filed on Aug. 11, 1986 and entitled Inert Atmosphere Control For Induction Heating Pressure Welding System.

FIELD OF THE INVENTION

The present invention relates to circuitry for controlling induction heating equipment, and more particularly to circuitry for sensing the temperature of articles to be welded, controlling heating currents so a pair of articles reach welding temperature substantially simultaneously allowing the articles to be forced together to provide a high strength weld.

SUMMARY OF THE INVENTION

The present invention discloses circuitry for controllling induction heating of a pair of articles to bring them to a welding temperature and for causing the heated articles to be pressed together to form a welded pair. The articles are positioned adjacent to each other with a small gap between them and an induction coil is moved into the gap between the articles. Electrical currents through the induction coil causes the articles to be heated and a temperature sensor monitors temperature of the articles. When the articles reach a welding temperature a signal from the temperature sensor causes the induction coil to be retracted from the gap and causes the articles to be forced together to form a welded pair. Temperature of the articles can be more accurately controlled by using a pair of induction coils and a pair of temperature sensors. A first temperature sensor monitors the temperature of a first article and a second temperature sensor monitors the temperature of a second article. A circuit controls the amount of electrical current to each induction coil so both articles reach welding temperature at substantially the same time so the quality of the weld joint is very good. The use of two coils and two sensors is especially useful when the two articles differ in size, shape or material.

BRIEF DESCRIPTION OF THE DRAWINGS

FIG. 1 is a diagrammatic view of welding apparatus used with the control circuitry of the present invention.

FIGS. 2A, 2B disclose a portion of the control circuit of the present invention.

FIG. 3 discloses circuitry for use with a pair of temperature sensors and a pair of induction coils to regulate the current to the individual induction coils.

DESCRIPTION OF THE PREFERRED EMBODIMENT

The induction heating apparatus of FIG. 1 includes a pair of end plates 11, 12 interconnected by a pair of rigid support tubes 13, 14. A hydraulic ram 18 having a cylinder 19 and a piston 20 is rigidly secured to the end plate 11 by a plate 24 and a plurality of bolts 25 with the cylinder 19 being secured to the plate 24. A piston rod 26 attached to the piston 20 extends through a bushing 30 in a bore 31 of the plate 11. The piston includes a plurality of annular sealing rings 32 mounted in a plurality of grooves 36. An annular sealing ring 37 provides a seal between the piston rod 26 and the plate 24. A conduit 38 selectively provides pressurized hydraulic fluid to extend the piston rod 26 to the left (FIG. 1) and a conduit 39 selectively provides pressurized hydraulic fluid to retract the piston rod to the right. A pair of fixtures 43, 44 are secured to the piston rod 26 and to the end plate 12 respectively. A pair of articles 45, 46 are secured in the fixtures 43, 44 and a pair of induction coils 50, 51 are mounted between the articles to provide induction heat to the articles. A pair of infrared pyrometers or other type of temperature sensors 52, 53 are mounted adjacent an inert gas chamber 57 to monitor the temperature of the articles 45, 46 through a pair of openings 60a, 60b in the chamber 57.

Signals from the temperature sensors 52, 53 are coupled to a temperature sensor module 58 by a pair of optical fiber conductors 62, 63 causing the temperature sensor module 58 to provide signals to a control circuit 59 which control the amount of current which a power unit 64 and a pair of power supplies 68, 69 provide to the induction coils 50, 51. A power control circuit 70 controls the sequence of operation of the power unit 64 and the hydraulic ram 18. Details of the control circuit 59 are disclosed in FIG. 3 and details of the power control circuit 70 are disclosed in FIGS. 2A, 2B. A temperature sensor module 58 (FIGS. 1, 2B) which can be used with the present invention is the Model 9112E-F made by Williamson Corporation, Concord, Mass. and a power unit 64 which can be used is the Model 200 KW/10 KHz Inductor Power Unit made by Tocco-Alabama, Inc., Boaz, Ala. Terminal T3 of FIG. 2A is connected to terminal T3 of FIG. 2B and terminal T4 of FIG. 2A is connected to terminal T4 of FIG. 2B so FIGS. 2A, 2B form the power control circuit 70.

When the articles 45, 46 (FIG. 1) are to be welded the articles are mounted in the fixtures 43, 44 and positioned with a gap of the proper size for inductor coils 50, 51 to fit between the articles 45, 46. Switches S2, S3 (FIG. 2A) are closed to connect coils 50, 51 to a corresponding lead of the power supplies 68, 69 and switches S4A, S4B (FIG. 2A), S6 (FIG. 2B) are closed to provide voltage to one terminal of switch PB5A and switch contact K4A. When switches S4A, S4B are connected in the "temp" position the temperature in articles 45, 46 determines when current to coils 50, 51 is terminated. When switches S4A, S4B are connected in the "time" position the articles are heated for a predetermined amount of time which is determined by an adjustable time delay relay TDR (FIG. 2A). When the pressure in a shop air supply 74 (FIG. 1) reaches operating value a "shop air" contact (FIG. 2A) is closed. The power control button PBL (FIG. 2A) is next closed actuating relay K1 and closing contacts K1A to provide 115 volts AC between the lines 75, 76.

Switches S8 and S18 are also closed with S18 causing lamp L22 (FIG. 2B) to provide a light current to energize a photocell PE which energizes relay LC and closes contact LCA. With S8 and LCA closed relay K8 is energized causing contacts K8A, K8B to close and K8C to open, and energizing the pump solenoid S13 (FIG. 2B) to start a hydraulic pump to provide hydraulic pressure in the system. When pressure comes up to an operating value a pressure switch (not shown) in a pressurized hydraulic supply 80 (FIG. 1) causes the switch PR (FIG. 2A) to close. The hydraulic supply 80 may include a hydraulic pump (not shown) and an accumulator (not shown) so that a relatively small pump can be used and the supply 80 will have sufficient pressurized fluid to operate the ram 18 and other hydraulic devices at relatively high speeds when appropriate valves are actuated. When switch S9A (FIG. 2B) is placed in the upper of clamp position the clamp solenoid S11 is actuated causing the articles 45, 46 to be securely clamped in place by apparatus disclosed in the related patent applications. A push button switch PB10 can be used instead of switch S9A to provide an intermittent movement of the clamping apparatus by holding PB10 closed for short periods of time. When switch S9A is placed in the lower or unclamp position an unclamp solenoid S12 is actuated so the articles 45, 46 are released.

A safety device includes a light curtain LC (FIG. 1) which extends from a light source L22 (FIGS. 1, 2B) across the front of the welding apparatus to a photocell PE so if a portion of a human operator or other object breaks the curtain of light between source L22 and the photocell PE causing the photocell PE to be rendered nonconductive. When PE (FIG. 2B) is no longer conductive the relay LC is deenergized causing contact LCA to open and deenergizing relay K8. When relay K8 is deenergized contact K8A opens deenergizing the hydraulic supply solenoid S13 so the hydraulic pump is shut down. Contact K8C closes causing a hydraulic dump solenoid S14 to be energized so the hydraulic fluid is dumped from the accumulators. Contact K8B (FIG. 2B) also opens deenergizing the forging valve solenoid S7 and disabling the forging valve 83 (FIG. 1). This prevents the ram 18 from being actuated and from moving articles 45 toward articles 46 and causing damage to any object which may be between these two articles. An "emergency stop" push button PB2 (FIG. 2A) can be depressed to remove power from lines 75, 76 in an emergency situation. A "cycle stop" push button PB4 can be depressed to stop operation of the device without removing power from the lines 75, 76.

The next step in the operation is to press the "arm air solenoid" push button closing switches PB5A, PB5B which energizes relays K4, K5 causing contacts K4A, K4B to close and causing contact K4C to open. Contact K4A provides a bypass for switch PB5A, and contact K4B causes air solenoid S5 to be energized. The energized air solenoid S5 causes the induction coils 50, 51 to be pulled into the gap between articles 45, 46. The moving coil 50 physically closes the "coil arm contact" CARM (FIG. 2A) to energize relay K6 and close contacts K6A, K6B in the coil/power supply circuit (FIG. 2A). The energized relay K5 closed contact K5A to provide a bypass for PB5B. If it is desired to shut down the compressed air supply the "disarm air solenoid" push button can be depressed opening contacts PB6A, PB6B and disabling relays K4, K5. A plurality of pilot lights PL1-PL16 are each connected in parallel with one of the relays and solenoids K1-K8, S1-S16 (FIGS. 2A, 2B) to provide a visual indication when the relays and solenoids are energized.

When it is desired that the coil current be terminated when the article temperature reaches a predetermined value a pair of switches S4A, S4B are placed in an upper or temperature position so a pair of relay contacts CSET, DSET control current through relay K4. When coil current is to be provided for a predetermined amount of time the switches S4A, S4B are placed in a lower or time position so a pair of relay contacts TDRA, TDRB control current through relay K4.

A ram switch S10 controls extension and retraction of the hydraulic ram 18 when a switch S9B is in the unclamp position. When switch S10 is in the EXT position an extend solenoid S15 is energized to cause the ram to be extended. when switch S10 is in the RET position a retract solenoid S16 is energized to cause the ram to be retracted. The solenoids S15, S16 allow small amounts of fluid to flow through conduits 38, 39 so the position of article 45 can be easily adjusted relative to the coils 50, 51. In contrast to this, forging solenoid S7 allows large amounts of fluid to flow through conduit 38 to drive the article 45 against article 46 when the coils 50, 51 are removed from between articles 45, 46.

To start the welding operation the "start cycle switch" PB3 is depressed energizing relays K2, S1 (FIG. 2A) thereby closing contracts K2A, K2B. Contact K2A bypasses switch PB3 and contact K2B connects relay K3 to the oxygen limit switch 02 which closes when an oxygen sensor 81 and an oxygen sensor unit 82 determine that the oxygen content in the inert gas chamber 57 (FIG. 1) reaches a predetermined low value. One oxygen sensor unit 82 and sensor 81 which can be used in the present invention is the Model Thermox II made by Ametek Thermox Instrument Division, Pittsburgh, Pa. When K3 is energized, by switch 02 closing, contacts K3A, K3B close to connect induction coils 50, 51 (FIGS. 1, 2A) to the respective power supplies 69, 68 to supply welding current to coils 50, 51 (S2, S3, K6A, K6B were previously closed). When the articles each reach a welding temperature, such as 2350° F., a pair of relays (not shown) in temperature sensor 58 are energized causing contacts CSET and DSET (FIG. 2A) to open to deenergize relay K4 and open contacts K4A, K4b which deenergizes solenoid S5. When solenoid S5 is deenergized coils 50, 51 drop from the gap adjacent articles 45, 46 and physically causing "coil clear" contacts CCLEAR to close which energizes relay K7, and the coils 50, 51 also cause contacts CARM to open. When contacts CARM open relay K6 is deenergized so contacts K6A, K6B in the inductor coil/power supply circuit (FIG. 2A) open. When relay K7 is energized contact K7A is closed causing forging valve solenoid S7 to be energized and allowing pressurized hydraulic fluid to flow through conduit 38 (FIG. 1) into hydraulic ram cylinder 19. The pressurized fluid forces the piston 20 toward the left and drives article 45 against article 46 so the heated portions of articles 45, 46 are welded together.

When the hydraulic pressure reaches a predetermined value the "ram pressure switch" RAM (FIG. 2A) opens causing relay K5 to be deenergized thereby opening contacts K5C which deenergizes relays K2, S1. When relay K2 is deenergized contacts K2B open which deenergizes relay K3 to open contacts K3A, K3B in the coil/power supply circuit (FIG. 2A).

The control circuit 59 (FIGS. 1, 3) monitors the temperature of the articles 45, 46 being heated and controls current to the inductor coils 50, 51 so both articles have the proper welding temperature when the articles are pressed together. This is done by reducing current to the coil adjacent the one article which is approaching welding temperature faster than the other article. When the articles 45, 46 are made of the same size and material the control circuit 59 is adjusted to heat both articles to the same welding temperature. When the articles 45, 46 are of different materials and/or have a different mass the control circuit can be adjusted to heat the articles to different temperatures for best welding. A pair of temperature transducers 86a, 86b (FIGS. 2B, 3) convert input temperatures into corresponding output voltages with input temperatures up to 1700° F. providing zero volts out, and with temperatures increasing to 3,000° F. providing a linear increase in voltage to one volt. The outputs of the transducers are coupled through a pair of switches S16, S17 (FIGS. 2B, 3) to a pair of signal conditioning circuits 87a, 87b in the control circuit 59. The control circuit 59 (FIG. 3) includes a plurality of integrated circuits such as the 9,000 Series made by Daytonic Corporation, Miamisburg, Ohio. The Model Number of each of the Daytonic integrated circuits which can be used in the control circuit 59 is printed in the corresponding block of FIG. 3.

The output signal from temperature transducer 86a is amplified by the signal conditioning circuit 87a and the amplified signal applied to a comparator 88a. A control circuit 92a provides a signal which sets the output level of comparator 88a. For example, a control signal from 92a may cause the output voltage from comparator 88a to have a value of zero until the input voltage reaches 0.1 volt, then the output voltage from comparator 88a increases in direct proportion to the input voltage. Transducers 86b and integrated circuits 87b, 88b, 92b function in the same manner as elements 86a, 87a, 88a, 92a, and the output signal comparators 88a, 88b are coupled to a respective pair diodes 93a, 93b with the larger of the output signals being coupled to an integrator 94. A control circuit 97 provides a control signal to a comparator 98 which compares this control signal with the level of the signal from the integrator 94. When the output voltage from the integrator 94 reaches the level of the voltage from the control 97 the integrator is put on hold and the integrator output voltage remains at the level of the control voltage.

The output voltage from the integrator 94, the signal from the signal conditioner 87a, and a "peak level" voltage from a level set circuit 99a are applied to a summing circuit 100a which developes an output voltage determined by the sum of the three input voltages. When the sum of the voltage from the integrator 94 and from the signal conditioner 87a is less than the level set voltage, the summing circuit 100a provides a voltage to a buffer 101a which amplifies the voltage and applies the amplified voltage to a signal conditioner 102a. The signal conditioner 102a provides an output voltage Ao (FIGS. 1, 3) which causes the power unit 64 to provide an induction current to the corresponding induction coil 50. The setting of a potentiometer 104a determines the heating rate of articles 50 (FIG. 1) by controlling the amplitude of signal Ao (FIGS. 1, 3). In a similar manner signals from the integrator 94, the signal conditioner 87b and the level set circuit 99b are applied to a summer 100b which provides signal to the buffer 101b. The signal from the buffer 101b causes the signal conditioning circuit 102b to supply a voltage Bo to the power unit 64 which in turn supplies an induction current through power supply 69 to the inductor coil 51.

The heating rate of the articles 45, 46 is also controlled by the setting of a potentiometer 105 by controlling the slope of the voltage waveform W3 at the output of integrator 94. The summer 100a compares the slope of the signal waveform W1, from the temperature sensor 86a and signal conditioner 87a, with the slope of the voltage waveform W3. If the slope of waveform W1 is different than the slop of waveform W3 summer 100a provides an output voltage which causes voltage Ao to increase or decrease the heating rate of the article 45 (FIG. 1) so the slope of waveform W1 more closely conforms to the slope of waveform W3. In a similar manner, the summar 100b compares the waveform W2 with waveform W3 and provides an output voltage which causes voltage Bo to modify the heating rate of article 46 until the slope of waveform W2 closely conforms to the slope of waveform W3. A potentiometer 106 controls upper temperature limits of the articles 50, 51 by limiting the maximum voltage into the summers 100a, 100b from integrator 94.

When the sum of the voltages from the signal conditioner 87a and the integrator 94 reach a value determined by the level set circuit 99a the output of the summer 100a and signal conditioner 102a decrease to a value of zero and terminates current to the corresponding inductor coil 50. In a similar manner when the signal voltages from the signal conditioner 87b and the integrator 94 equal the value of the voltage from the level set circuit 99b the summer 100b provides an output voltage of zero which causes the Bo signal to power unit to decrease to a value of zero and terminate the current to the inductor coil 51.

The present invention monitors the temperature of a pair of articles being heated by induction currents, controls the rate of heating and the welding temperatures of the articles. When the articles reach proper welding temperatures the inductor coils are removed from a gap between the articles and the articles forced together to form a welded pair.

Although the best mode contemplated for carrying out the present invention has been herein shown and described, it will be apparent that modification and variation may be made without departing from what is regarded to be the subject matter of the invention.

What is claimed is:

1. A dual induction heating pressure welding apparatus having a control circuit for controlling induction heating of two articles to be welded together along interfacing portions, the apparatus having an induction coil for each interfacing portion to be heated, means for clamping each article to the apparatus at a spaced apart distance between the interfacing portions for providing clearance for receiving the insertion of the induction coils therebetween, means for moving at least one of the clamping means toward the other clamping means for pressing the heated interfacing portions together upon the interfacing portions reaching a welding temperature for welding the articles together, means for moving the induction coils into the space between the interfacing portions for heating the interfacing portion and for moving the coils out of the space simultaneously with the coil moving means moving the one clamping means toward the other clamping means, a source of current for heating the induction coils, means in the circuit for actuating said coil moving means for moving said coils into the space between said interfacing portions, means in the circuit for connecting each of said coils to said current source when said coils are in said space for inducing heating current in said interfacing portions, means in the circuit for sensing the temperature of each of said heated interfacing portions of said articles for preventing uneven heating of the interfacing portions by controlling the heating current directed to each of said coils by the current connecting means, means in the circuit for actuating said coil moving means for retracting said coils from said space when said heated interfacing portions of said articles reach said welding temperature, and means in the circuit for actuating said clamp moving means for pressing said heated interfacing portions of said articles together when said interfacing portions reach said welding temperature for welding said interfacing portions together.

2. The apparatus and circuit claimed in claim 1, including means in the circuit for limiting the distance said heated interfacing portions of said articles are pressed together.

3. The apparatus and circuit claimed in claim 1, further including means for pivotally mounting said coils to facilitate movement of said coils into and out of said space.

4. The apparatus and circuit claimed in claim 2, including means in the circuit for limiting the amount of force for pressing said interfacing portions of said articles together at the welding temperature.

5. The apparatus and circuit claimed in claim 4, including means in the circuit for selecting the amount of time said interfacing portions of said articles are heated.

6. The apparatus and circuit claimed in claim 5, including means in the circuit for selecting a maximum temperature to which said interfacing portions of said articles are heated.

7. The apparatus and circuit claimed in claim 1, wherein said sensing means in the circuit decreasing the current in one of said coils when the temperature in one interfacing portion of one article is increasing at a faster rate than temperature in the other interfacing portion of the other articles, and increasing the current in one of said coils when temperature in one interfacing portion of one article is increasing at a slower rate than the temperature in the other interfacing portion of the other article.

8. A control system for an induction heating pressure welding apparatus having an induction coil movable into and out of an operable position between two interfacing surfaces to be welded, and a pressing means for pressing the two interfacing surfaces together, said control system comprising:
- a power supply connectable to the coil through a first switch means,
- an actuator for moving the inductive coil into and out of the operative position, and which is operably connected to a second switch means,
- a temperature sensor for monitoring the temperature of the interfacing surfaces to be welded,
- a first contact for sensing when the coil is in an operative position and which connects and disconnects the coil with the power supply,
- time and temperature dependent switches for determining respectively the length of time for, or the temperature to which, said interfacing surfaces are heated, and which are operatively connected to the temperature sensor so as to operate said actuator when a predetermined welding temperature is reached, or after a predetermined welding time has lapsed to remove the coil from its operative position by operation of the second switch means.
- a control means connected to the temperature sensors for control of the power supply to the coil,
- a second contact means for sensing when the coil is in the non-operative position, and which is operably connected to said first switch,
- the pressing means for pressing the heated surfaces together being operatively connected to the first contact for pressing the welded surfaces together when the coil is removed from its operative position.

9. A control system as claimed in claim 8, wherein the actuator is a fluid actuator and there is further provided means for sensing when the fluid pressure supply to the fluid actuator is at an operational value, and said means allowing power supply to the coil only when the supply pressure is at the operational value.

10. A control system as claimed in claim 8, wherein there is provided a safety device in the form of a light source and a photocell, said photocell being operatively connected to the pressing means so as to cut-off power to the forgoing means if the light source is cut-off from the photocell.

11. A control system as claimed in 10, wherein the pressing means includes a hydraulic ram, operated by hydraulic power supply and a hydraulic pressure sensor senses when the pressure is at an operational value, said sensor allowing power supply to the coil only when the hydraulic pressure is at the operational value.

12. A control system as claimed in claim 8, and further including an oxygen limit sensor which is operatively connected to permit supply of welding current to the coil when the oxygen level is at a predetermined low value.

13. A control system as claimed in claim 8, wherein the control system is for the control of welding apparatus having two coils heating the two interfacing surfaces to be welded and wherein two temperature sensors each connect with a temperature transducer which provides a temperature signal proportional to the temperature of the surface to be welded, each temperature signal is integrated and passed to a respective comparator for comparison with a control signal, the larger of the two comparator outputs are coupled to a third integrator which produces a signal which is passed to a third comparator for comparison with a third control signal, so that the maximum integrator output signal is held at the same level as the third control signal, each temperature signal integrator is connected to a summer, which also receives a signal from a level set and the third integrator output signal, so that each summer provides an output signal for control of the power supply to the induction coils.

14. A control system as claimed in claim 13, wherein each summer also compares the slope of the temperature signal waveform with the slope of the third integrator output voltage and operates the power supply to the coils to make the respective temperature signal waveforms conform more closely to the waveform of the third integrator output voltage.

15. A control system as claimed in claim 14, wherein the signal from each level set is controlled by the setting of a respective potentiometer for controlling the amplitude of the power supply to the respective induction coil.

16. A control system as claimed in claim 15, wherein the slope of the third integrator output voltage signal is controlled by setting a further potentiometer.

17. A control system as claimed in claim 16, wherein the third control signal for the third comparator is set by a third potentiometer to control the maximum third integrator output signal.

* * * * *